United States Patent
Ishii et al.

(10) Patent No.: US 11,138,014 B2
(45) Date of Patent: Oct. 5, 2021

(54) BRANCH PREDICTOR

(71) Applicant: Arm Limited, Cambridge (GB)

(72) Inventors: Yasuo Ishii, Austin, TX (US); Houdhaifa Bouzguarrou, Valbonne (FR); Thibaut Elie Lanois, Antibes (FR); Guillaume Bolbenes, Antibes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/775,431

(22) Filed: Jan. 29, 2020

(65) Prior Publication Data

US 2021/0232400 A1 Jul. 29, 2021

(51) Int. Cl.
*G06F 9/38* (2018.01)
*G06F 1/03* (2006.01)

(52) U.S. Cl.
CPC ........... *G06F 9/3844* (2013.01); *G06F 1/03* (2013.01); *G06F 9/3806* (2013.01); *G06F 9/3814* (2013.01)

(58) Field of Classification Search
None
See application file for complete search history.

(56) References Cited

U.S. PATENT DOCUMENTS

| | | | | |
|---|---|---|---|---|
| 4,942,520 A * | 7/1990 | Langendorf | .......... | G06F 9/3844 711/123 |
| 5,995,749 A * | 11/1999 | Tran | .......... | G06F 9/3844 712/233 |
| 6,754,813 B1 * | 6/2004 | Nakada | .......... | G06F 9/325 712/239 |
| 9,378,020 B2 * | 6/2016 | Bonanno | .......... | G06F 9/30047 |
| 9,983,878 B2 * | 5/2018 | Levitan | .......... | G06F 9/30058 |
| 2014/0089647 A1 * | 3/2014 | Kountanis | .......... | G06F 9/38 712/240 |
| 2014/0297996 A1 * | 10/2014 | Jayaseelan | .......... | G06F 9/3848 712/239 |
| 2018/0293076 A1 * | 10/2018 | Sadasivam | .......... | G06N 3/063 |
| 2019/0163902 A1 * | 5/2019 | Reid | .......... | G06F 9/3851 |
| 2019/0384612 A1 * | 12/2019 | Evers | .......... | G06F 9/3844 |

* cited by examiner

*Primary Examiner* — Eric Coleman
(74) *Attorney, Agent, or Firm* — Nixon & Vanderhye P.C.

(57) ABSTRACT

A branch predictor provides a predicted branch instruction outcome for a current block of at least one instruction. The branch predictor comprises branch prediction tables to store branch prediction entries providing branch prediction information; lookup circuitry to perform, based on indexing information associated with the current block, a table lookup in a looked up subset of the branch prediction tables; and prediction generating circuitry to generate the predicted branch instruction outcome for the current block based on the branch prediction information in the branch prediction entries looked up in the looked up subset of branch prediction tables. The looked up subset of branch prediction tables is selected based on lookup filtering information obtained for the current block. Lookups to tables other than the looked up subset are suppressed.

20 Claims, 11 Drawing Sheets

BRANCH PREDICTOR

BACKGROUND

Technical Field

The present technique relates to the field of data processing. More particularly, it relates to branch prediction.

Technical Background

Data processing apparatus may have a branch predictor for predicting outcomes of branch instructions. This can help to improve performance by allowing subsequent instructions beyond the branch to be fetched for decoding and execution before the actual outcome of the branch is determined.

SUMMARY

At least some examples provide an apparatus comprising: a branch predictor to provide a predicted branch instruction outcome for a current block of at least one instruction, the branch predictor comprising: a plurality of branch prediction tables to store branch prediction entries providing branch prediction information; lookup circuitry to perform, based on indexing information associated with the current block, a table lookup in a looked up subset of the branch prediction tables; and prediction generating circuitry to generate the predicted branch instruction outcome for the current block based on the branch prediction information in the branch prediction entries looked up in said looked up subset of the branch prediction tables; in which: the lookup circuitry is configured to obtain lookup filtering information corresponding to the current block, and to select based on the lookup filtering information which of the plurality of branch prediction tables are in said looked up subset of the branch prediction tables for which the table lookup is to be performed for the current block; and the lookup circuitry is configured to suppress performing the table lookup for branch prediction tables other than said looked up subset of the branch prediction tables selected based on the lookup filtering information.

At least some examples provide a branch prediction method for providing a predicted branch instruction outcome for a current block of at least one instruction, the branch prediction method comprising: obtaining lookup filtering information corresponding to the current block; selecting, based on the lookup filtering information, which of a plurality of branch prediction tables are in a looked up subset of the branch prediction tables for which a table lookup is to be performed for the current block, the plurality of branch prediction tables storing branch prediction entries providing branch prediction information; based on indexing information associated with the current block, performing the table lookup in the looked up subset of the branch prediction tables; and generating the predicted branch instruction outcome for the current block based on the branch prediction information in the branch prediction entries looked up in said looked up subset of the branch prediction tables; in which: the table lookup is suppressed for branch prediction tables other than said looked up subset of the branch prediction tables selected based on the lookup filtering information.

Further aspects, features and advantages of the present technique will be apparent from the following description of examples, which is to be read in conjunction with the accompanying drawings.

DESCRIPTION OF EXAMPLES

Figure 1:
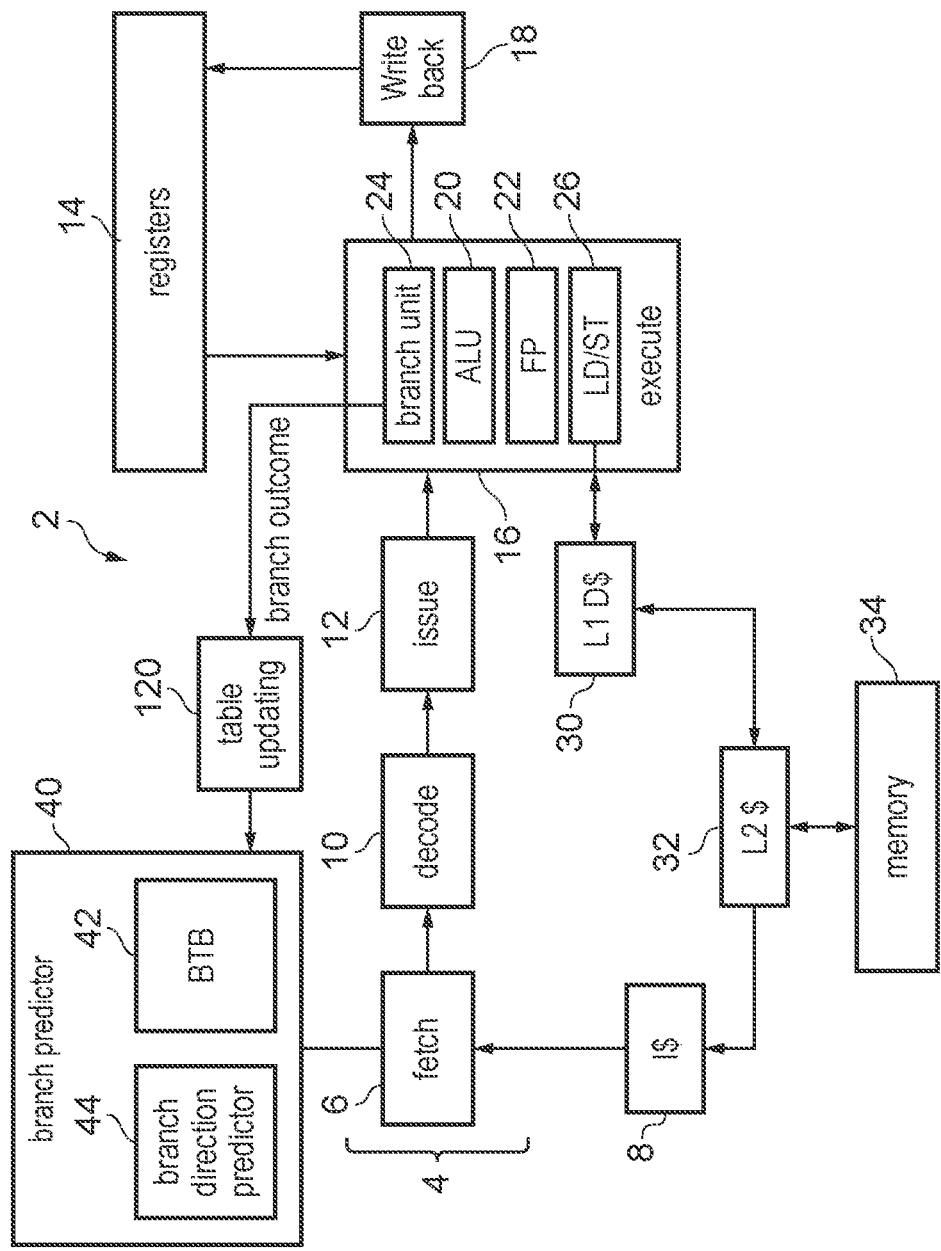
FIG. 1 schematically illustrates an example of a data processing apparatus having a branch predictor.

An apparatus has a branch predictor for providing a predicted branch instruction outcome for a current block of at least one instruction. The branch predictor includes a number of branch prediction tables to store branch prediction entries providing branch prediction information. Lookup circuitry performs, based on indexing information associated with the current block, a table lookup in a looked up subset of the branch prediction tables. Prediction generating circuitry generates the predicted branch instruction outcome for the current block based on the branch prediction information in the branch prediction entries looked up in the looked up subset of the branch prediction tables.

One reason for the relatively high levels of performance achieved on modern processors is that branch prediction structures may include two or more distinct tables of branch prediction entries which can be indexed based on information associated with a current block of one or more instructions to be predicted, and the prediction for that block can be formed based on the indexed entries in each of those tables. For a typical branch predictor, the looked up subset of branch prediction tables would always include all of the branch prediction tables. However, the inventors recognised that often the branch prediction entries in some of those tables may not contribute to the predicted branch instruction outcome generated for the current block for which the lookup operation was performed. For example, some of the looked up entries may be ignored in favour of other entries, or may output a value which does not contribute significantly to the overall prediction because an entry in another table may dominate. Hence, often the power consumed in looking up each of the branch prediction tables is wasted. Nevertheless, it may be desirable to continue to provide all of those tables, because there are branches for which the increased number of tables can be useful to improve performance. However, as there are also other branches for which the full capacity of the branch prediction tables may not be fully utilised, for some branches there may be some unnecessary lookups.

Hence, in the techniques discussed below, the lookup circuitry obtains lookup filtering information corresponding to the current block of one or more instructions for which the branch instruction outcome is to be predicted. Based on the lookup filtering information, the lookup circuitry selects which of the two or more branch prediction tables of the branch predictor are in the looked up subset of branch prediction tables for which the table lookup is to be performed for the current block. The lookup circuitry suppresses preforming the table lookup for branch prediction tables other than the looked up subset of branch prediction tables selected based on the lookup filtering information. Hence, while still providing the two or more branch prediction tables to help improve prediction performance for the hard-to-predict branches which may not successfully be predicted with a smaller branch predictor, the efficiency of the branch predictor can be increased by maintaining lookup filtering information which tracks which branch prediction tables are expected to be useful for a particular block of instructions, and this can be used to save power by suppressing lookups which would be unlikely to yield useful branch prediction information for a particular block of instructions. Hence, the overall balance between processing performance (branch prediction accuracy) and power efficiency can be improved.

When the lookup filtering information is used to filter which branch prediction tables are looked up, for some blocks the looked up subset of branch prediction tables may exclude at least one branch prediction table. When making a prediction for a block for which the lookup filtering information indicates that at least one branch prediction table is to be excluded from the subset, then power can be saved by not reading any entries of the excluded branch prediction table (and in some examples, also by omitting comparison operations for comparing tag values stored in one or more entries of the table with a corresponding tag value associated with the indexing information of the current block).

For other blocks, sometimes the lookup filtering information could specify that all branch prediction tables are to be included in the looked up subset, and in this case then there may be no branch prediction tables excluded from the lookup for that particular lookup operation. For example, there may be some branches for which the branch predictor has found that the full capacity of the branch prediction tables is useful for being able to accurately predict the outcome of that branch, to provide improved performance. Hence, it is not necessary that a branch prediction table needs to be excluded from the lookup for every lookup operation. The lookup circuitry has the capability to suppress performing a table lookup for a given branch prediction table outside the looked up subset for at least some blocks being looked up in the branch predictor.

In some implementations, the branch predictor may perform a separate lookup for each instruction, and in this case the current block may comprise a single instruction. However, other examples may perform branch prediction lookups for a block of two or more instructions in a single lookup operation, and in this case the current block may comprise two or more instructions. This block-based approach can help to save power by reducing the number of table lookup operations required for processing a given number of instructions.

The branch prediction tables may include at least two tables each providing branch prediction entries providing the same type of branch prediction information (e.g. an indication of a taken/not taken prediction, or a weight contributing to a prediction of a taken/not taken outcome), but which are indexed based on different subsets of the indexing information associated with the current block. The provision of a number of different tables which effectively record the same type of information, but are indexed based on different subsets of indexing information can help to provide good performance by allowing alternative outcomes of the same branch instruction in different program execution scenarios to be represented within the branch predictor. However, this means that, depending on the actual scenario in which the branch is encountered on a given instance of reaching that branch, the entry indexed based on the current set of indexing information may differ, and so some of the entries may be redundant. This is why it can be useful to suppress some table lookups as discussed above.

The indexing information may be any set of information which is used by the branch predictor to identify which entry in its branch prediction tables should be used to form the predicted branch outcome. For example, the indexing information could include a program counter address identifying the current block of one or more instructions. Also the indexing information could include history information which tracks some information about the path taken in program execution to reach the current block. For example, the history information could be based on a history of previous branch outcomes, a history of previous instruction addresses of branch instructions, or a history of target addresses of previous branch instructions. Regardless of the particular type of indexing information, in some implementations this indexing information may directly select certain entries of the branch prediction table to be read in the lookup from a given branch prediction table within the subset of tables indicated by the lookup filtering information. Also, the indexing information could include tag information which is to be compared with a corresponding tag value in a looked up branch prediction entry to determine whether that branch prediction entry actually corresponds to the current block or instead corresponds to a different block of one or more instructions which shares the same branch prediction entry.

The prediction generating circuitry may be capable of generating the predicted branch instruction outcome such that, for at least some instances of generating the predicted branch instruction outcome for the current block, the predicted branch instruction outcome is the same regardless of the branch prediction information stored up in a looked up branch prediction entry in at least one of the branch prediction tables. Hence, there may be some redundancy in the branch prediction state stored in the branch predictor, and not all of the branch prediction state in entries read when looking up the tables for a given block of instructions may actually contribute to the predicted branch instruction outcome. The technique discussed here exploits this by filtering lookups for tables previously found to not be useful. This enables power to be saved.

The branch predictor may have table updating circuitry for performing a table update based on an actual branch instruction outcome determined for an executed block of at least one instruction, to update one or more branch prediction entries in an updated subset of the branch prediction tables. This updated subset may be determined independent of the lookup filtering information. Hence, an update in the tables may be made once the actual branch outcome arising from execution of the executed block of at least one instruction is known, and depending on the table update, the table updating circuitry may also update the lookup filtering information for the executed block. For example, when the actual branch instruction outcome is known, then it may be determined that subsequent predictions of that outcome could be based only on a subset of the branch prediction tables, and so in this case the lookup filtering information for the executed block could be updated to indicate that subset of tables, so that lookups of other tables are suppressed on future attempts to predict the same block of instructions when that block is treated as the current block for a later branch prediction cycle.

In one example, the table updating circuitry may set the lookup filtering information for the executed block to indicate that at least one branch prediction table is to be excluded from the looked up subset of the branch prediction tables for the executed block, when the table update indicates that, following the table update, a subsequent prediction of the predicted branch instruction outcome for the executed block would be the same regardless of the branch prediction information stored in a branch prediction entry corresponding to the executed block in the at least one branch prediction table.

On the other hand, the lookup filtering information for the executed block may be set to indicate that at least one branch prediction table is to be included in the looked up subset of the branch prediction tables for the executed block, in response to the table update allocating a new branch prediction entry for the executed block in that at least one branch prediction table or determining that a subsequent prediction of the predicted branch outcome for the executed block would depend on the branch prediction information stored in a branch prediction entry corresponding to the executed block in the at least one branch prediction table.

Hence, by tracking, at the time of updating the branch prediction tables, which tables are expected to contribute to subsequent branch predictions for the same block, this can allow prediction lookups in unused tables to be filtered on subsequent cycles to save power.

A branch predictor may include a number of different branch prediction structures for predicting different aspects of branch instruction behaviour. For example, the branch predictor could include a branch direction predictor for predicting the taken/not-taken outcome for a branch. The branch predictor could also include a branch target buffer for predicting other properties of branch instructions, such as their branch type and their target address. Also, in some cases the branch target buffer may be used to determine whether a certain block of one or more instructions is predicted to include a branch at all. There may also be other types of branch prediction structure included in the branch predictor for predicting special cases, such as for predicting the outcome of certain harder to predict branches which require a dedicated set of indexing information, or for predicting return addresses of function returns.

The techniques discussed above for filtering table lookups can be used for any branch prediction structure having multiple tables, where there may sometimes be some redundancy so that lookups to some tables may not always contribute to the predicted outcome. However, the technique is particularly useful for the branch direction predictor which predicts whether branches are taken or not taken. Branch direction predictors may increasingly include a relatively large number of tables indexed based on different subsets of indexing information. Hence, for some branches, the branch predictor may learn to use the branch prediction entry in one table and may not use an entry corresponding to the same branch in another table, and so in this scenario it can be useful to track the unused tables in the lookup filtering information and then suppress unnecessary lookups to save power.

The lookup filtering information for the current block could be stored in a variety of storage structures. There may be a wide range of different options for implementing the storage of the lookup filtering information, a number of which are described below.

In one example where the branch predictor includes a branch direction predictor for predicting, as the predicted branch instruction outcome, a taken/not-taken outcome of a branch, and a branch target buffer (BTB) for predicting at least one other branch property for the current block, the lookup circuitry could obtain the lookup filtering information from a selected BTB entry of the BTB. As often the BTB may need to be looked up anyway for predicting the property of a given block, for example for predicting whether the current block of instructions is expected to include a branch at all, or for predicting the branch target address, then by storing the lookup filtering information in the BTB this can avoid needing to perform a further lookup of an additional structure, as instead the existing BTB lookup could be reused to also provide the lookup filtering information.

In one example, the selected BTB entry which stores the lookup filtering information for the current block may be the BTB entry which corresponds to that current block itself. Hence, when looking up the BTB to identify the other branch properties of the current block, the BTB may also return the lookup filtering information which can then be used to control which subset of branch prediction tables in the branch direction predictor is looked up for the current block. In this case, the BTB and the branch direction predictor may be looked up sequentially, with the BTB being looked up first and then the branch direction predictor being looked up once the lookup filtering information has been obtained from the BTB entry corresponding to the current block. This approach may be relatively simple to implement in circuitry.

Alternatively, the selected BTB entry which provides the lookup filtering information for the current block could be a BTB entry corresponding to a preceding block of at least one instruction which was looked up in a preceding branch prediction cycle to the branch prediction cycle in which the predicted branch instruction outcome is generated for the current block. Hence, with this approach each BTB entry for a given block of one or more instructions may indicate the predicted branch properties of that given block of one or more instructions, but may indicate the lookup filtering information for the next block of one or more instructions which is predicted to be executed next after the given block. For example, if the given block was a block of instructions including a branch predicted to be taken, then the next block after the given block would be the block of one or more instructions starting from the branch target address of the branch predicted to be taken. Hence, with this approach a BTB entry for one block can be annotated with the lookup filtering information for the next block, so that it is possible to look up the branch direction predictor for one block in parallel with looking up the BTB for the same block, because the lookup filtering information for filtering which tables to look up in the branch direction predictor is already available from the preceding branch prediction cycle. Hence, this approach can improve performance by avoiding the delay associated with waiting for the BTB lookup before performing the branch direction prediction lookup.

Another option is that the lookup filtering information is stored in a lookup filter storage structure separate from the BTB. Hence, a dedicated lookup filter storage structure could be provided comprising a number of lookup filter entries, with each lookup filter entry mapping an instruction address of a respective block of at least one instruction to corresponding lookup filtering information. With this approach, the lookup circuitry could, in response to the indexing information for the current block of one or more instructions, first look up the lookup filter storage structure to identify the lookup filtering information, and then based on the lookup filtering information control looking up the branch direction predictor. Both the lookup filter storage structure and the branch direction predictor could be looked up in parallel with a lookup into a branch target buffer. One might question why it is useful to provide a separate lookup filter storage structure from a BTB if the lookup filter storage structure has to be looked up sequentially with a branch direction predictor anyway, as this would appear to be similar in terms of performance to the example above where the lookup filtering information is stored in the BTB entry corresponding to the current block. However, in practice the BTB may be a relatively complex structure which may have a relatively large number of entries, and so may have a relatively long lookup time. In contrast, the lookup filter storage structure may be a much simpler structure, for example having fewer entries than the BTB. Hence, a lookup time for looking up the lookup filter storage structure may be shorter than a lookup time for looking up the BTB. Therefore, if a small enough filter structure is provided then it may be possible to look up both the lookup filter storage structure and the branch direction predictor in a time short enough that this can be done within the same number of cycles as the number of cycles taken for a branch direction predictor lookup in an alternative predictor not supporting any lookup filtering.

Another option may be that the lookup filtering information could be stored in one of the branch prediction tables itself. For example, the lookup circuitry may obtain the lookup filtering information from a branch prediction entry looked up in at least one of the two or more branch prediction tables, and then the lookup filtering information may specify whether at least one other branch prediction table is in the looked up subset of branch prediction tables for the current block. Hence, with this approach the at least one branch prediction table which stores the lookup filtering information may be considered to be part of the looked up subset of tables for each block, and the lookup filtering information may only allow the other tables not storing the lookup filtering information to be excluded from the looked up subset.

Another option could be that the lookup filtering information for the current block is stored in an instruction cache. Again, the entry of the instruction cache used to store the lookup filtering information associated with a current block could be either the entry which stores the current block of instructions itself or the entry which stores instructions from a preceding block.

Hence, it will be appreciated that there are a variety of ways in which the lookup filtering information could be stored, depending on the choice made by the designer of the particular microarchitecture for a branch predictor.

Also, there are a variety of ways in which lookup filtering information could represent which particular branch prediction tables are to be included or excluded in the looked up subset of branch prediction tables for the current block. In one example, the lookup filtering information may comprise a number of table subset membership indications, each indicating whether a corresponding set of one or more branch prediction tables is in the looked up subset of branch prediction tables for the current block. For example, the lookup filtering information could comprise a bitmap where each of the table subset membership indications is a single bit flag specifying whether the corresponding set of one or more branch prediction tables is excluded or included in the subset of branch prediction tables to be looked up for the current block.

For some implementations, each table subset membership indication could correspond to a single branch prediction table, so the lookup filtering information could individually specify on a table-by-table basis whether each table is to be included or excluded in the subset of branch prediction tables to be looked up. This approach may give the greatest flexibility in individually activating or suppressing the lookups to each table for a given block of instructions.

Alternatively, other approaches could reduce the storage overhead by encoding the lookup filtering information less precisely, so that for at least one of the table subset membership indications the corresponding set of one or more branch prediction tables includes two or more branch prediction tables. Hence, two or more branch prediction tables may share the same table subset membership indication, so that the lookup filtering information cannot indicate a different status for those two or more branch prediction tables (either each of the two or more branch prediction tables sharing the same table subset membership indication is included in the looked up subset, or each of the two or more branch prediction tables sharing the same table subset membership indication are excluded from the looked up subset). Often, the majority of the power saving achieved through the lookup filtering can be achieved through a relatively coarse-grained approach where the lookup filtering information does not indicate individual tables exactly, but instead indicates groups of tables as being included in or excluded from the looked up subset, and so the added overhead of setting individual table subset membership indications for each individual table may not be justified. The group-based tracking can be more efficient in terms of area and power consumption.

Another approach for representing the lookup filtering information can be to use a threshold value which marks a certain threshold table within the group of branch prediction tables in the branch predictor. For example, the branch prediction tables may be indexed based on different lengths of history information as discussed above. One branch prediction table may be indexed based on a relatively short length of history information corresponding to a certain number of recently seen instructions or branches, while a different branch prediction table may be indexed based on longer history information which corresponds to a greater number of instructions or branches.

Here, the "length" of history is considered longer for history information which depends on properties of a greater number of recently executed instructions than for history information which depends on properties of fewer recently executed instructions. In some embodiments, history information with a longer length may comprise a greater number of bits than history information with a shorter length. For example, portions of data for each instruction or block of instructions considered in the history could be concatenated to form the overall history information, with different numbers of portions being concatenated to form the respective lengths of history. However, this is not essential, and other examples may use hashing to reduce portions of data representing properties of instructions or blocks of instructions to a smaller number of bits. It is possible that longer length history information could in some cases be represented using a data value having the same number of bits as shorter length history information (e.g. an iterative hashing process could be used to fold in the properties of each instruction or block of instructions considered in the history information into a history value of the same length regardless of the number of times the hash is iteratively applied).

In one example, the looked up subset of branch prediction tables may exclude those branch prediction tables for which the length of the history information used for indexing is longer than the history information used for indexing for the threshold table indicated by the lookup filtering information. This can be a useful approach for representing the lookup filtering information, as the threshold table indication may require fewer bits than the table subset membership indications described above. Often the tables indexed with the longest length of history information may be the tables which are most likely to not be needed for a reasonable fraction of blocks. This is because the longer history tables may be useful for predicting the hardest to predict branches which represent the minority of branch instructions, and the majority of branch instructions can be predicted more easily using tables with a shorter length of history. Hence, by representing the lookup filtering information as a threshold which effectively represents the length of history beyond which it is not worth looking up any tables, this can provide a relatively area-efficient mechanism for tracking the lookup filtering information. Also, with this approach it can be relatively efficient to implement the circuit logic for updating the lookup filtering information, as it may be possible to provide a simple comparison of whether, on updating the branch prediction tables, the update involves a branch prediction table which uses longer history than the table currently indicated by the threshold, and if so to update the threshold to match that table being updated. Hence, this embodiment can be attractive in terms of ease of circuit implementation and storage overhead.

In one example with the threshold based approach, it may be possible to use a binary value for the threshold which can specify each of the branch prediction tables as the threshold table. However, it may not be necessary to be able to precisely set the threshold at any particular table within the branch predictor, and it may be sufficient to define a certain number of thresholds (less than the total number of branch prediction tables) at which the threshold table may be defined. In this case, the lookup filtering information may specify the threshold table from among two or more candidate threshold tables, and the candidate threshold tables may exclude at least one of the branch prediction tables. This approach of selecting one of a limited subset of candidate threshold tables can again help to reduce the storage overhead, because the size of the lookup filtering information can be lower than a numeric binary value selecting the threshold from among the entire set of branch prediction tables.

The techniques discussed in this application can be applied to different types of branch direction predictors. In one example, the branch prediction may comprise tagged-geometric (TAGE) tables, which are indexed based on different lengths of history information associated with the current block. When the table lookup hits (i.e. detects a matching entry) in at least two TAGE tables, the prediction generating circuitry may generate the predicted branch instruction outcome based on a hit branch prediction entry in one of the at least two TAGE tables which was indexed based on a longest length of history information. That is, a TAGE branch predictor may preferentially select a branch prediction based on an entry hit in a table indexed based on a longer history information, but if no hit is identified in the longer history tables then a prediction from a table indexed based on a shorter length of history can be used instead. This approach can provide high performance, and TAGE-based predictors are one of the most accurate branch prediction schemes currently known. However, they do result in many table lookups being performed in the respective TAGE tables and often many of these lookups may be unnecessary because the prediction ends up being made based on an entry in a different table, and so these unnecessary lookups can be avoided using the lookup filtering approach described above. Hence, the present technique can be particularly useful for TAGE based branch predictors.

However, the technique can also be used for other types of branch predictors such as a perceptron-based branch predictor where the branch prediction tables are perceptron weight tables indexed based on different subsets of indexing information associated with a current block. Each perceptron weight table may provide a weight value associated with the current block. The prediction generating circuitry may generate the predicted branch instruction outcome by adding the weights obtained from branch prediction entries looked up in each of the looked up subset of branch prediction tables. At first glance, one might expect that for a perceptron-based branch predictor there is no benefit to lookup filtering as the prediction is formed by adding the weights from all of the looked up tables, unlike the TAGE based branch predictor where the prediction is formed from a single entry in a single table. Hence, it may be surprising that the lookup filtering approach is useful for a perceptron-based branch predictor. However, the inventors recognised that although the weights from all the tables may be added to form the prediction, in practice some of the weights may have relatively low absolute values which do not significantly contribute to the overall prediction, and the prediction result may be dominated by the contribution made by weights in other tables. Hence, at the time of updating the weights in the perceptron weight tables for an executed block, the table update circuitry could detect that a given weight in a given table will not contribute to the overall prediction and could then update the lookup filtering information to indicate that it is not worth looking up that prediction table on a future prediction for the same block of instructions, so that power can be saved. For example, for the perceptron-based branch predictor, the table update circuitry could update the lookup filtering information to indicate that a given branch prediction table is to be excluded from the looked up subset of branch prediction tables, when it is determined that the weight to be stored in that given branch prediction table in the entry associated with the executed block of instructions is less than the margin representing the difference between the sum of the weights corresponding to the executed block in all of the branch prediction tables and a threshold value for deciding whether to indicate that the predicted branch outcome for that block of instructions is to be taken or not taken. If replacing a weight in an entry in a given table with zero would make no difference to whether the sum of the weights in the relevant entries in all the tables falls one side of the threshold or the other, then it is not necessary to look up the table because the weight value does not contribute significantly to the outcome, and so it is possible to filter out such lookups on subsequent occasions. Again, this helps to save power in a perceptron based branch predictor.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/ store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

Figure 2:
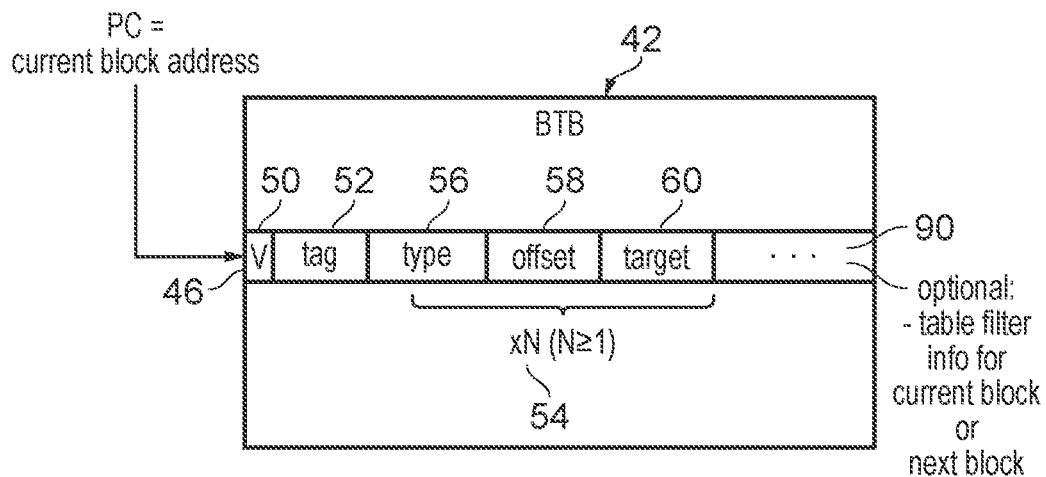
FIG. 2 shows an example of a branch target buffer (BTB)

FIG. 2 shows an example of the BTB 42, which acts as a cache comprising a number of entries 46 which are indexed based on program counter address representing the address of a current block of one or more instructions for which the prediction lookup is to be made. In many modern processors, the BTB 42 is looked up a block of instructions at a time, so the program counter represents the first instruction in the looked up block. For example, the program counter may be the address of a block of instructions determined to be fetched by the fetch stage 6 and the branch predictor may be looked up to identify whether that block of instructions will contain any branches, so that the address of the next block of fetched instructions can be predicted.

In this example, each BTB entry 46 includes a valid field 50 indicating whether the entry is valid, a tag field 52 for comparing with a tag portion of the current block address to determine whether the entry corresponds to that address, and one or more sets of branch property information 54 indicating one or more branch properties for a branch instruction within the current block. In this example, each set 54 of branch property information indicates a predicted branch type 56 (which could indicate whether the branch is a function calling branch, a function return branch, a conditional branch, a non-conditional branch, or other branch types), a branch offset 58 which indicates an offset of the instruction address of the branch relative to the instruction address of the first instruction in the current block, and a branch target address 60 predicted to be the address of the instruction to which the branch would redirect program execution if the branch was taken. As shown in FIG. 2, it is possible for the BTB entry to include more than one set of branch properties, to predict properties of two or more branches in the same block.

Hence, on looking up the BTB, if it is determined that the valid field 50 indicates that the entry indexed based on the current block address is invalid, then it is predicted that there are no branches in that block and so the next block to be fetched would be the block which lies sequentially after the current block. Similarly, if a valid entry is indexed based on the current block address, but the tag 52 of that entry does not match a tag associated with the current block address, then again there may be predicted not to be any branches for that block and instruction fetching continues sequentially. However, if on indexing into the BTB entry 46 for the current block there is a matching tag 52 for a valid entry 50 then the branch properties are predicted based on the set of property information 54 recorded in the BTB entry.

It will be appreciated that FIG. 2 just shows one possible example for representing the branch information in the BTB 42, but other BTB techniques can also be used.

Figure 14:
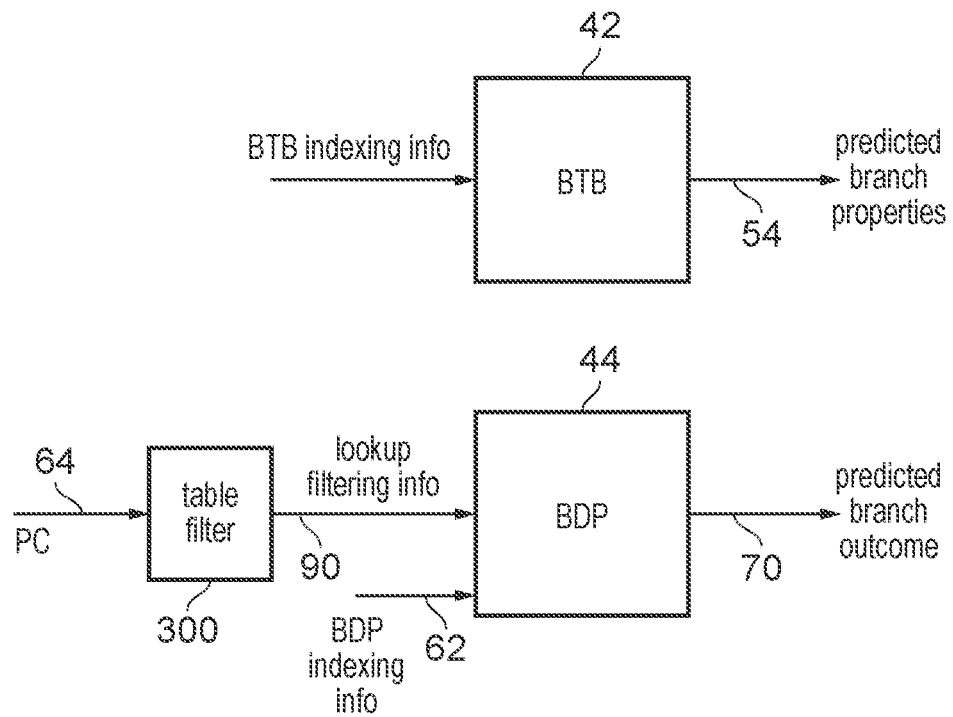
Figure 16:
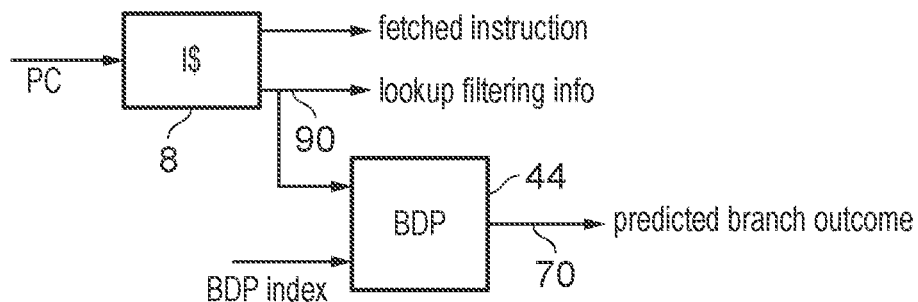
Figure 17:
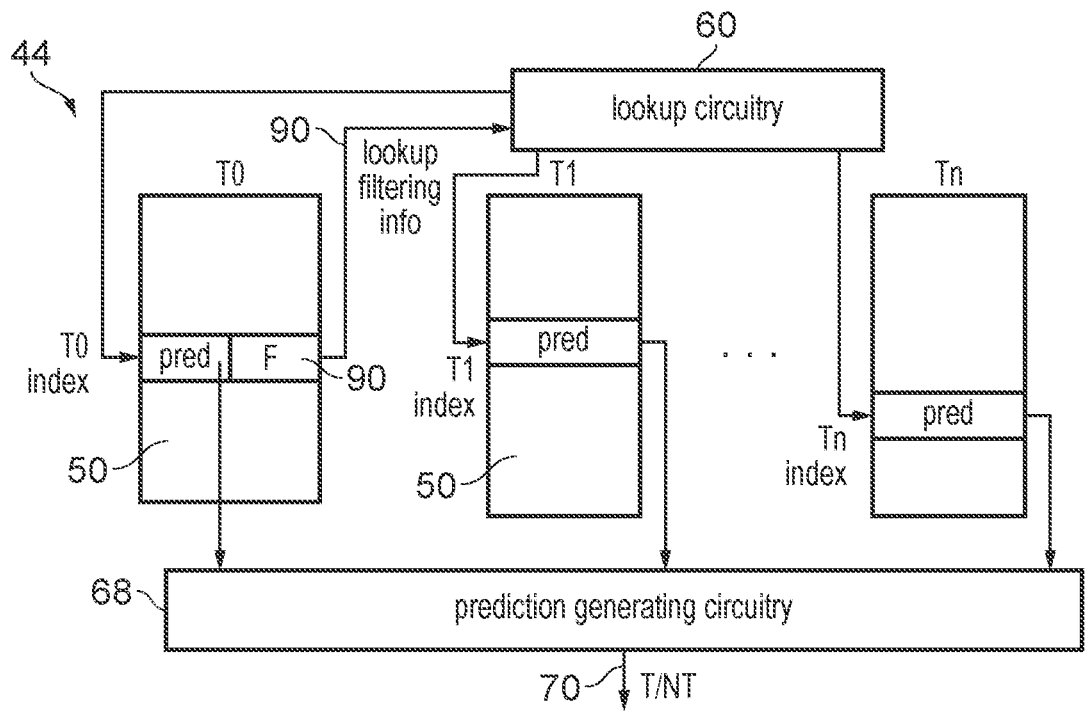

As shown in FIG. 2, optionally, it is possible in some implementations to provide table filtering information 90 within a BTB entry 46. This table filtering information could be either associated with the current block itself (i.e. with the same block of instructions for which the respective sets of branch properties 54 are indicated) or could be associated with the next block of instructions predicted to be executed after the current block. Alternatively, as shown in the examples of FIG. 14 and FIGS. 16 and 17 below, some implementations may not use the BTB to provide table filtering information at all, and so in this case the information 90 could be omitted from the BTB 42 and stored elsewhere.

Figure 3:
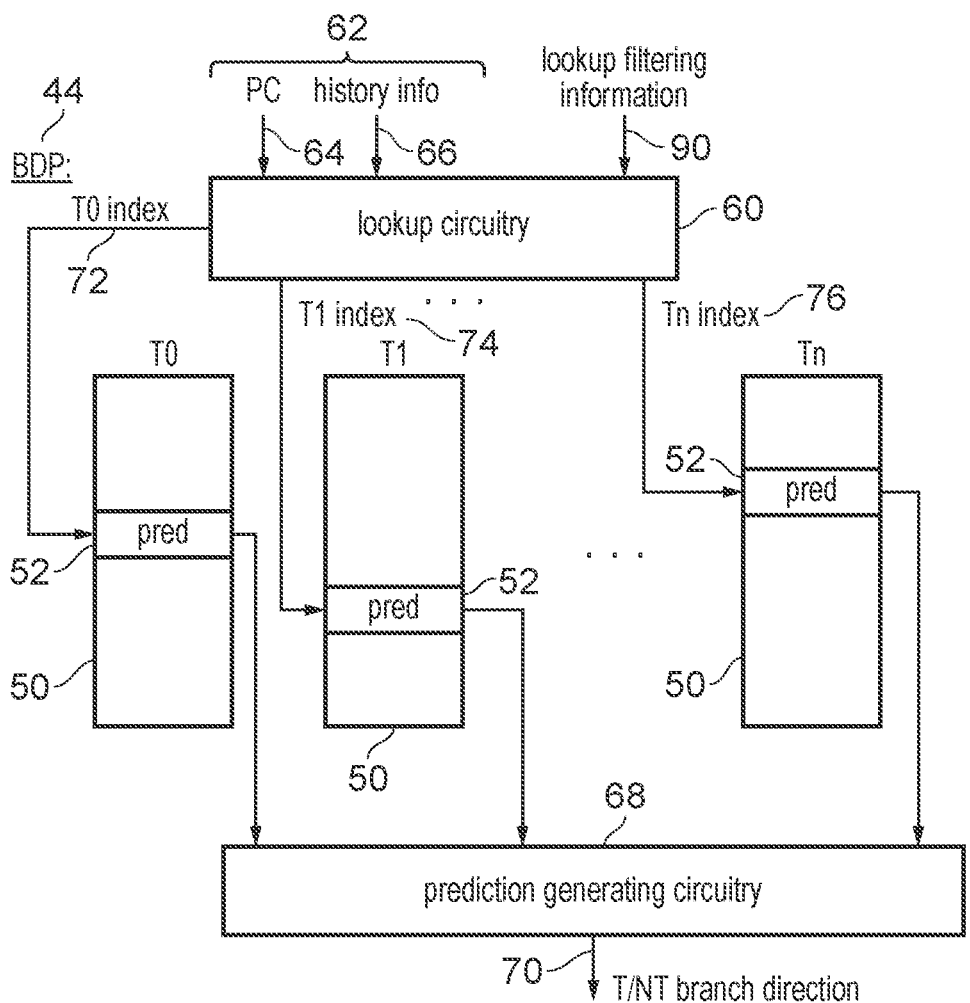
FIG. 3 shows an example of a branch direction predictor (BDP)

FIG. 3 shows an example of the branch direction predictor 44 within the branch predictor 40. The branch direction predictor (BDP) 44 can be looked up either in parallel with the BTB 42 or sequentially. The BDP 44 includes a number of prediction tables 50 which each comprise prediction entries 52 storing branch prediction information. Different types of BDP could record different types of information within each prediction entry 52, so the precise information indicated can vary. For example the prediction information could include a counter which is incremented and decremented in response to actual branch taken or not taken outcomes detected by the branch unit 24 in the execute stage 16, and the counters may be compared with a threshold to determine whether to predict a given branch as taken or not taken. Other approaches as discussed below could use entries 52 which specify prediction weights which are to be added together to form the overall prediction. In some cases, the prediction entries could provide branch direction predictions for more than one branch in the same block, or provide an indication of which of two or more branches in the same block is the first predicted taken branch, which in some embodiments can be used for selecting between multiple sets of branch property information 54 in the BTB 42. For conciseness, the description below describes one branch direction prediction per block.

The BDP 44 includes lookup circuitry 60 which receives a number of pieces of indexing information 62, for example the program counter address 64 representing the address of the current block of instructions to be predicted and history information 66 which tracks an aspect of the history which led to the current block of instructions being reached. For example, the history information could be based on a global history register which captures the taken/not taken outcomes of the most recently executed N branches, where N is some arbitrary integer chosen by the micro-architecture designer. Hence, each time a branch is executed, a bit indicating whether its outcome is taken or not taken may be shifted in at one end of the global history register, with the outcome of the least recently executed branch being shifted out of the register at the other end, and outcomes of more recently executed branches all shifting up one position within the register. In this way a history value which depends on the path taken in program flow to reach the current block of instructions can be maintained, which can help to distinguish different routes by which the same block of instructions may be reached through different program flow outcomes. This can help to ensure that different branch predictions can be made for the different scenarios in which the same instruction address may be encountered, to try to predict data-dependent branch decisions for example. Another example of a history value 66 which could be used as indexing information 62 could be a value which is permuted on each branch based on the instruction address of the branch and/or the target address of the branch, so as to track a history of branch jump points. Alternatively, a subset of bits of a branch instruction address or branch target address could be shifted into a history register similar to the branch outcome indicating bits as discussed above. Some implementations may use a combination of types of history derived from different pieces of information tracking recent history of program flow.

Hence, based on the indexing information 62, the lookup circuitry 60 indexes into a number of entries 52 in the respective branch prediction tables 50, and entries 52 selected based on the indexing information 62 are read in each of those tables. Prediction generating circuitry 68 combines the information from the looked up entries in the various tables 50 to form the overall predicted branch outcome 70 which indicates whether one or more branches in the current block of instructions are to be taken or not taken.

The different prediction tables 50 of the BDP 44 may each be indexed based on a different subset of the indexing information 62. For example a table T0 may be indexed based on T0 indexing information 72 selected from the indexing information 62 provided to the lookup circuitry 60, another table T1 may be indexed based on T1 indexing information 74, and so on until the last table Tn is indexed based on Tn indexing information 76. Each of these sets of indexing information 72, 74, 76 may be selected from among the overall set of indexing information 62 available. For example, the various pieces of indexing information 72, 74, 76 could be based on successively longer sequences of branch history as indicated by the history information 66.

Figure 4:
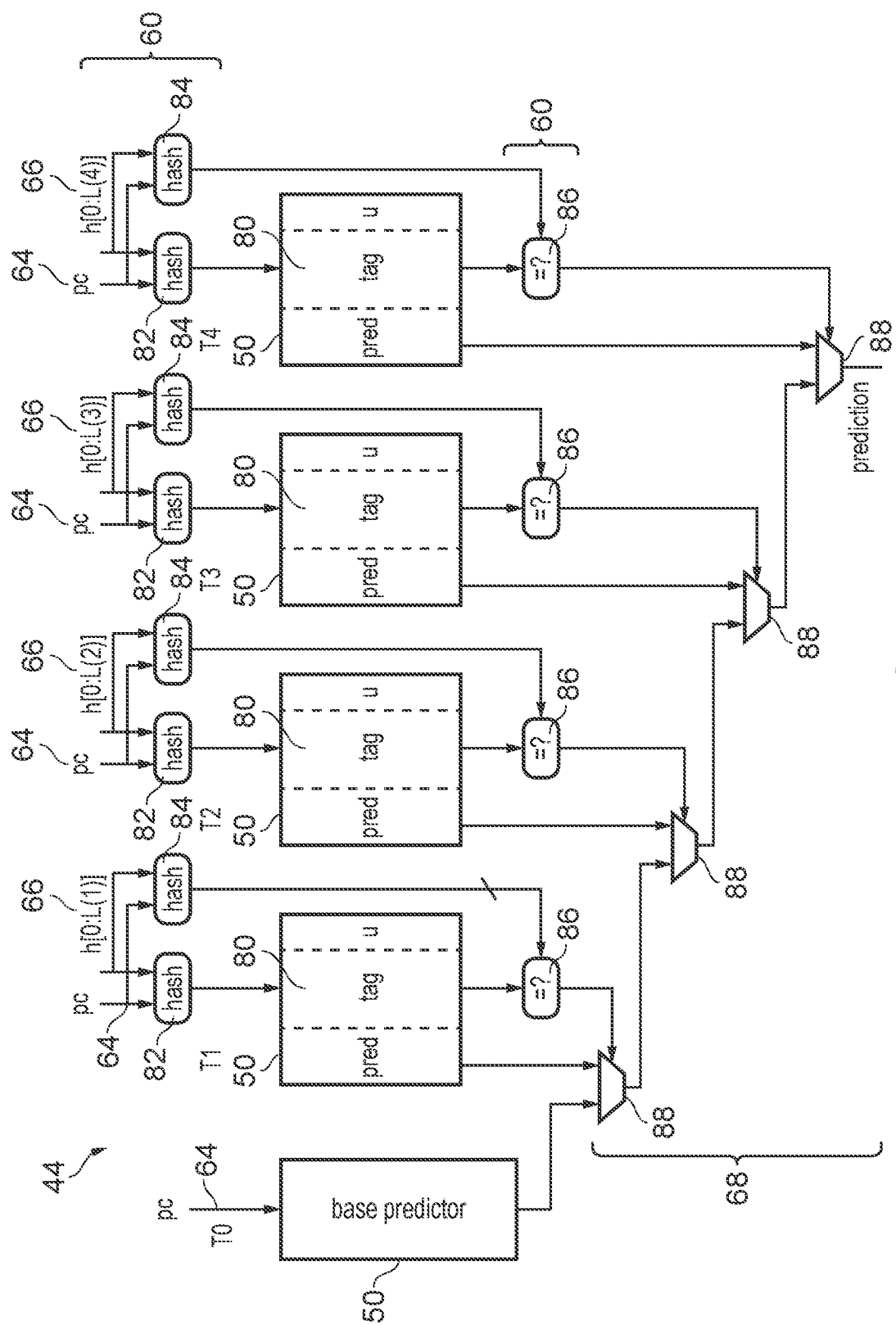
FIG. 4 shows an example where the BDP is a TAGE branch predictor.

FIG. 4 shows a specific example of a BDP 44, which is a TAGE predictor for which the branch prediction tables 50 include a base prediction table T0 and a number of tagged-geometric (TAGE) tables T1 to T4. While this example shows 4 TAGE tables for conciseness, it will be appreciated that the TAGE predictors could be provided with a larger number of tables if desired, e.g. 8 or 16. The base predictor T0 is indexed based on the program counter PC alone, while the TAGE tables T1 to T4 are indexed based on a hash value generated by applying a hash function to the PC 64 and successively increasing lengths of history information 66, so that T1 uses a shorter sequence of history information compared to T2, T2 uses a shorter sequence of history information compared to T3, and so on. In this example T4 is the table which uses the longest sequence of history information. Each prediction entry specifies a prediction counter ("pred"), for example a 2-bit counter which provides a bimodal indication of whether the prediction is to be taken or not taken (e.g. counter values 11, 10, 00, 01 may respectively indicate predictions of: strongly predicted taken, weakly predicted taken, weakly predicted not taken, and strongly predicted not taken). Each entry also specifies a tag value 80 which is compared with a tag hash generated from the indexing information 62 to detect whether the entry corresponds to the current block being looked up (the tag distinguishes between multiple blocks whose index hash values alias onto the same entry of the table). The lookup circuitry includes index hashing circuitry 82 for generating the index hash for indexing into a selected entry of the table, tag hashing circuitry 84 for generating a tag hash value to be written to a newly allocated entry or for comparing with an existing entry's tag value 80 on a lookup, and comparison circuitry 86 for comparing the tag value 80 read out from a looked up entry with the calculated tag hash generated by the tag hashing circuitry 84 to determine whether a hit has been detected.

For a TAGE predictor, the TAGE prediction generating circuitry 68 comprises a cascaded sequence of selection multiplexers 88 which select between the alternative predictions returned by any of the prediction tables 50 which generate a hit. The base predictor 50 may always be considered to generate a hit, and is used as a fall-back predictor in case none of the other TAGE tables generate a hit (a hit occurs when the tag in the looked up entry matches the tag hash generated based on the indexing information). The cascaded multiplexers are such that if the table T4 indexed with the longest sequence of history generates a hit then its prediction will be output as the prediction result, but if it misses then if the preceding table T3 generates a hit then the T3 prediction will be output as the overall prediction for the current block, and so on, so that the prediction which gets selected is the prediction output by the table (among those tables which generated a hit) which corresponds to the longest sequence of history considered in the indexing. That is, any tables which miss are excluded from the selection, and among the remaining tables the one with the longest sequence of history in its indexing information is selected, and if none of the TAGE tables T1 to T4 generate a hit then the base predictor T0 is selected.

This approach is extremely useful for providing high performance because a single table indexed with a fixed length of branch history has to trade off the accuracy of predictions against the likelihood of lookups hitting in the table. A table indexed with a relatively short sequence of branch history may be more likely to generate a hit, because it is more likely that the recently seen history leading to the current block is the same as a previously seen sequence of history for which an entry is recorded in the table, but as the shorter sequence of history cannot distinguish as precisely between the different routes by which the program flow may have reached the current block, it is more likely that the prediction indicated in the hit entry may be incorrect. On the other hand, for the table T4 which is indexed based on the longest sequence of history, this can be extremely useful for predicting harder to predict branches which need to delve further into the past in terms of exploring the history so that that the pattern of program execution which led to that branch can be characterised and an accurate prediction made, however, it is less likely on subsequent occasions that the longer sequence of history will exactly match the sequence of history leading up to the current block and so the hit rate is lower in a table indexed based on a longer sequence of history. By providing a range of tables with different lengths of history used for indexing, this can balance these factors so that while the hardest to predict branches which would be difficult to predict using other branch predictors can be successfully predicted with the longer table T4, other easier to predict branches which do not require the full prediction capability of T4 can be predicted using one of the earlier tables indexed based on shorter history so that it is more likely that a hit will be detected on a prediction lookup, thus increasing the percentage of branches for which a successful prediction can be made and therefore improving prediction accuracy and performance. Hence, TAGE predictors are one of the most accurate predictors known.

Figure 5:
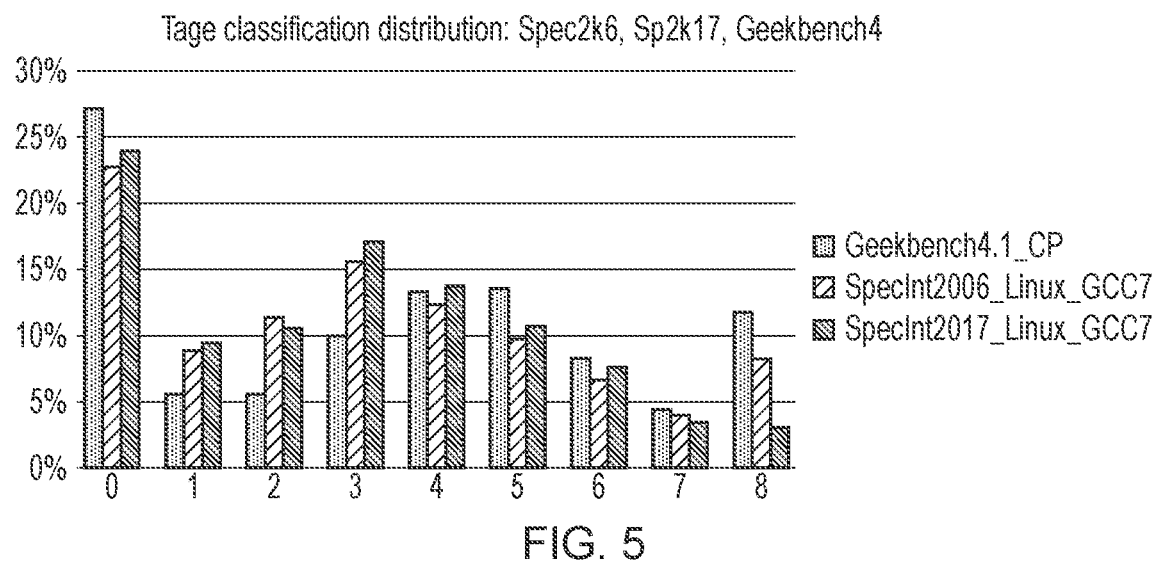
FIG. 5 is a graph illustrating the results of modelling execution of various benchmark processing algorithms to determine the frequency distribution with which branch instructions have their outcomes predicted using different tables of the TAGE predictor.

FIG. 5 is a graph which shows results of modelling execution of a number of common processing benchmarks and tracking, which of the tables 50 was used to provide the prediction for predicting each branch. In this example, the TAGE predictor has the base predictor T0 and 8 TAGE tables T1 to T8 indexed based on successively longer branch history. FIG. 5 is a bar chart showing the relative frequency distribution for the different prediction tables 50, indicating the percentage of branches in each benchmark which were predicted using the output of that table. As shown in FIG. 5, the percentage of branches which need all eight of the TAGE tables to be able to predict them accurately was less than 15% for the Geekbench benchmark and was less than 3% for the SpecInt2017 benchmark. Hence, for the majority of branches, looking up table T8 which is indexed based on the longest sequence of history is a waste of energy because its contents will not be used anyway as the lookup would miss in that table. Similarly, it can be seen from FIG. 5 that around 70-80% of branches do not need any lookups in any branch prediction table 50 other than the base predictor 50.

Figure 6:
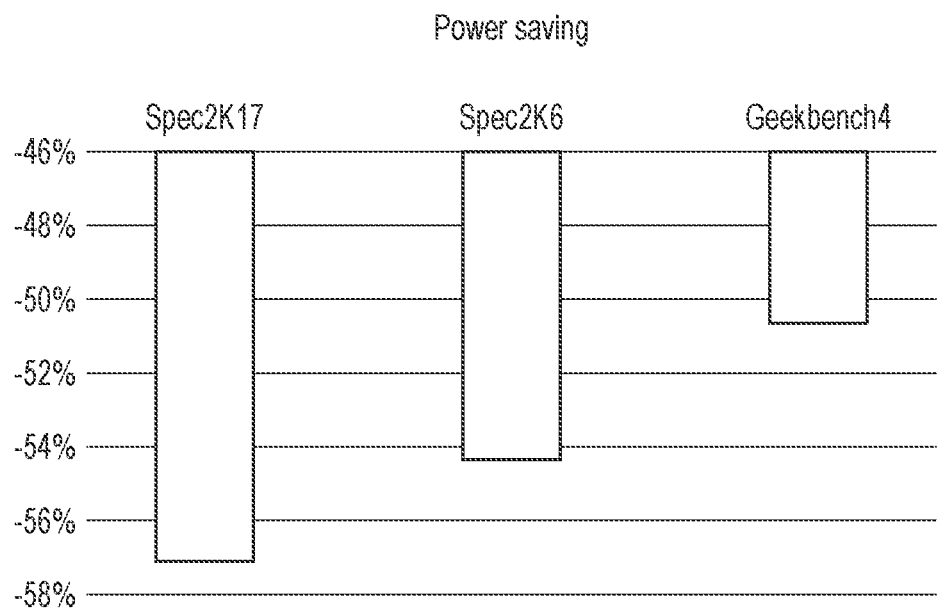
FIG. 6 is a graph showing an estimated power saving for these benchmarks which could be achieved by suppressing table lookups based on lookup filtering information.
Figure 9:
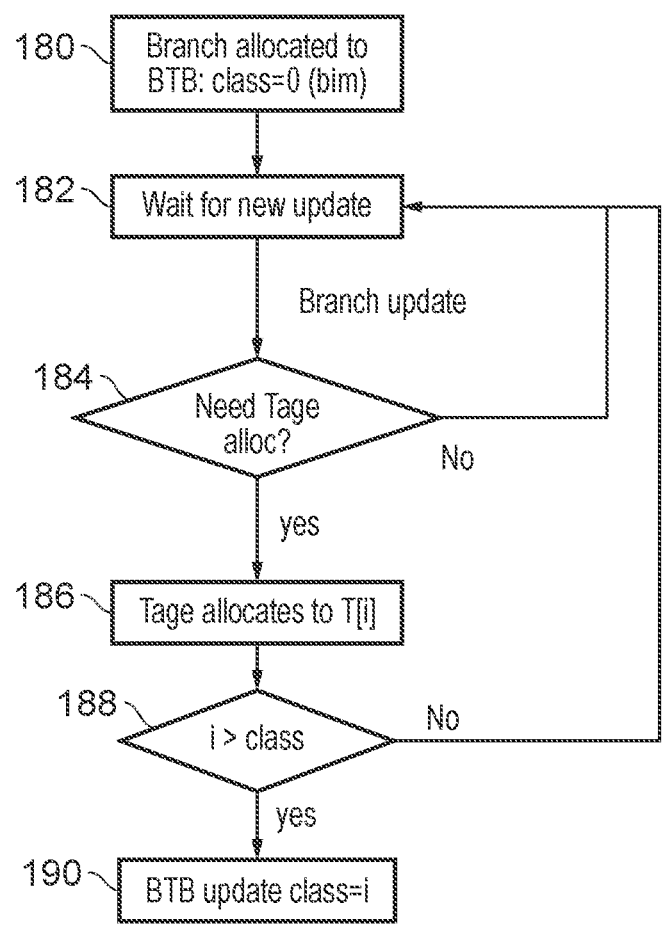
FIG. 9 shows another example of updating the lookup filtering information for a TAGE branch predictor.

Hence, modern high performance branch predictors may include a lot of redundant lookups. As shown in FIG. 3, the lookup circuitry 60 may be provided with lookup filtering information 90 which indicates which subset of the branch prediction tables of the BDP 44 are to be looked up for a given block of instructions, and the lookup circuitry 60 can suppress lookups for any branch prediction tables 50 which are not in the looked up subset of tables indicated by the lookup filtering information 90. By avoiding looking up unneeded tables this can greatly reduce the power consumption of the branch predictor 40. For example, FIG. 6 is a graph showing power savings estimated from modelling the execution of the benchmarks described above, in an implementation which maintains lookup filtering information using the method described in more detail with respect to FIG. 9 below. In the example of FIG. 9, the lookup filtering information is represented using a class threshold which identifies the longest history table to which an entry has been allocated for the corresponding block of instructions, and on each lookup, lookups to higher table numbers than the threshold table are suppressed to save power (e.g. if the threshold is T4 then tables T5-T8 are not looked up). The modelling has shown that power savings of between 57% and 51% can be achieved as shown in the graph of FIG. 6. It was also found from the modelling that using this lookup filtering approach did not produce a significant change in the misprediction rate, only adding a very small number of mispredictions (around 0.5% for Geekbench, 0.24% for SpecInt2017 and 0.34% for SpecInt2006). This is because the updating of the lookup filtering information as the corresponding branch prediction state is updated can rapidly change the classification for a given block of instructions, and so there is not a long warm up time for the classification to reach its preferred value. Hence, it can be seen that this lookup filtering technique can achieve considerable power savings with little impact on prediction accuracy. Of course, this modelling is for a particular embodiment of FIG. 9, but it will be appreciated that power savings could similarly be achieved even if the lookup filtering information is maintained in a different manner.

Figure 7:
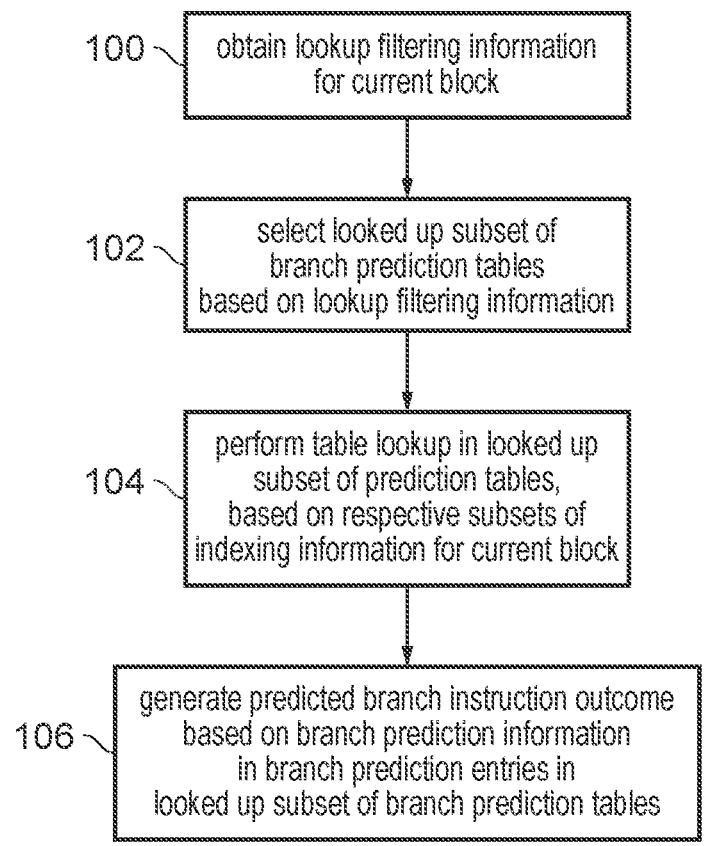
FIG. 7 is a flow diagram showing a method of controlling a lookup in a branch prediction structure having a number of branch prediction tables.

FIG. 7 is a flow diagram showing a method of looking up a branch predictor. At step 100 the lookup circuitry 60 obtains the lookup filtering information 90 for the current block. At step 102, based on the lookup filtering information 90, the lookup circuitry 60 selects a looked up subset of branch prediction tables 50. At step 104, the lookup circuitry 60 performs a table lookup in the looked up subset of branch prediction tables 50, based on respective subsets of indexing information 62 for the current block of one or more instructions. Any branch prediction tables 50 which the lookup filtering information indicated should be excluded from the looked up subset have their corresponding lookup suppressed. Hence, it is not necessary to read the storage entries of those excluded branch prediction tables, or to activate the comparison logic 86 for comparing tags output from those tables with the tag hash generated from the indexing information 62. This can save a considerable amount of power. At step 106, the prediction generating circuitry 68 generates the predicted branch instruction outcome 70 based on the branch prediction information in the branch prediction entries in the looked up subset of branch prediction tables 50. The inputs to the prediction generating circuitry 68 for any tables excluded from the looked up subset can be clamped to a value which will not affect the final result, so that they do not influence the generation of the predicted branch instruction outcome. For example, the hit signals generated by the comparison logic 86 for any tables which were excluded from the lookup could be clamped to the value indicating that there was a miss.

Figure 8:
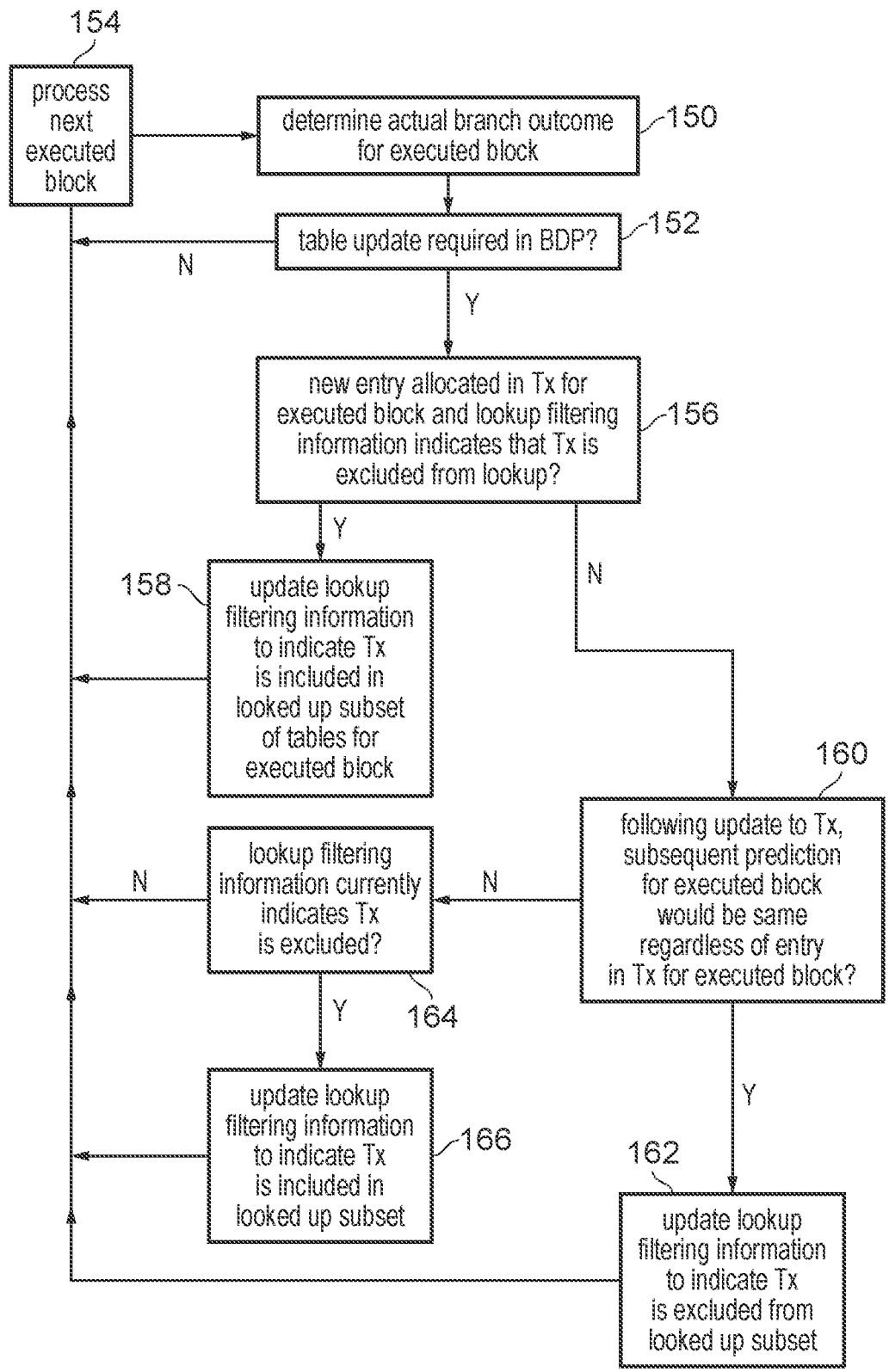
FIG. 8 is a flow diagram illustrating a method of updating lookup filtering information based on an actual branch outcome determined for an executed block of one or more instructions.

FIG. 8 is a flow diagram showing updating of the lookup filtering information 90. As shown in FIG. 1, the apparatus 2 may have table updating circuitry 120 which receives signals from the branch unit 24 indicating the actual branch outcome of instructions, such as indications of whether a taken branch was detected in a given block of instructions, and if so the detected branch type, target address or other properties. If a branch was detected to be not taken then this is also provided to the table updating circuitry 120. The table updating circuitry 120 then updates state within the BTB 42, the branch direction predictor 44 and other branch prediction structures to take account of the actual results seen for an executed block of instructions, so that it is more likely that on encountering the same block of instructions again then a correct prediction can be made.

Hence, based on the actual branch outcome the table updating circuitry 120 may have decided that a certain pattern of updates is needed in the prediction tables 50 of the BDP 44, and so the table updating circuitry 120 has knowledge of which of the tables are likely to make a significant contribution to subsequent predictions for the same block of instructions. Hence, it can be useful to update the filtering information 90 at the same time as updating other prediction state.

Hence, at step 150 of FIG. 8 the actual branch outcome is determined by the branch unit 24 for an executed block of instructions and at step 152 the table updating circuitry 120 determines whether a table update is required in the BDP 44. If no update is required then the method proceeds to step 154 to await processing of the next executed block of instructions, and the method returns to step 150.

When a BDP update is required then at step 156 the table updating circuitry 120 determines whether a new entry is to be allocated in a certain prediction table Tx (where x is between zero and n) corresponding to the executed block of instructions, when the lookup filtering information currently indicates that table Tx is excluded from the looked up subset of tables. If a new entry is to be allocated for Tx and Tx is currently excluded from the lookup, then at step 158 the table updating circuitry 120 updates the lookup filtering information 90 for the executed block to indicate that table Tx is included in the looked up subset of tables for the executed block and then the method returns to 154. This ensures that on subsequent prediction cycles when a lookup is made for the same block of instructions then the table Tx including the newly allocated entry will be looked up.

Otherwise, if no new entry needs to be allocated or the lookup filtering information already indicated that a table Tx including a newly allocated entry is included in the lookup then at step 160 a check is also made to check whether following any updates made in an entry in a given table Tx, a subsequent prediction made for the executed block of instructions would be the same regardless of the value provided in the prediction entry corresponding to that block within table Tx. If so, then at step 162 the lookup filtering information 90 is updated by the table updating circuitry 120 to indicate that table Tx can be excluded from the looked up subset as it would not contribute to the prediction outcome the next time a lookup is made. The method then returns to step 154.

Alternatively, if the update to Tx is such that the updated value would contribute to a subsequent prediction, then at step 164 it is checked whether the lookup filtering information 190 for the executed block currently indicates that table Tx which was updated is excluded from the looked up subset and if so then at step 166 the lookup filtering information 90 is updated to indicate that Tx should be included in the looked up subset, so that the updated entry can contribute on the next prediction cycle when a lookup is made for the executed block. Alternatively, if the lookup filtering information already indicated that Tx was included in the looked up subset then step 166 does not need to be performed. Either way, the method returns to step 154 to await processing of the next executed block.

Hence, updates to the lookup filtering information 90 can be made based on whether, on an update to a table, it is expected that the corresponding prediction value will contribute to a result in future. It will be appreciated that FIG. 8 shows some general rules but not all of these may be relevant for a particular BDP implementation, and so some implementations may not need both of the checks shown in steps 156 and 160, or could perform the checks in parallel or in a different order to the order shown.

FIG. 9 shows a more specific example of updating the lookup filtering information 90 for the TAGE predictor example of FIG. 4. In this example, as the prediction generating circuitry 68 forms the prediction based on a cascaded order of preference, then a relatively simple way to indicate the excluded subset of tables can be for the lookup filtering information 90 to identify a class for the corresponding block of instructions, where the class represents the threshold table beyond which it is not worth performing a table lookup.

Hence, at step 180, branches allocated initially in the BTB 42 could by default be considered to have class zero so that initially the lookups will only lookup the base predictor T0 in the BDP 44, but will not lookup any of the TAGE tables T1 to Tn. At step 182 the table updating circuitry waits to detect when a new update to the BDP entries associated with the corresponding block of instructions is needed, and when such an update is encountered then at step 184 it is determined whether an allocation of a new entry into one of the higher TAGE tables T1 to Tn is needed. If not then there is no need to change the current classification, but if a TAGE allocation is needed then at step 186 the table updating circuitry allocates a new entry into one of the higher tables Ti. At step 188 it is determined whether i is greater than the current value of the class threshold specified as the lookup filtering information 90 for the corresponding block of instructions and if not then the class can remain the same. If the current class is less than the identifier i associated with the table into which the new entry was allocated, then at step 190 the class value can be updated to match the table allocated with the entry so that the class threshold becomes equal to i. In this way, the class may track the highest TAGE table into which an allocation has been made for a given block. When controlling lookups, the lookup circuitry can exclude from the lookup any tables with table identifiers greater than the class value specified for the corresponding block of instructions. This is the approach taken in the modelling which was performed to generate the graph in FIG. 6.

Figure 10:
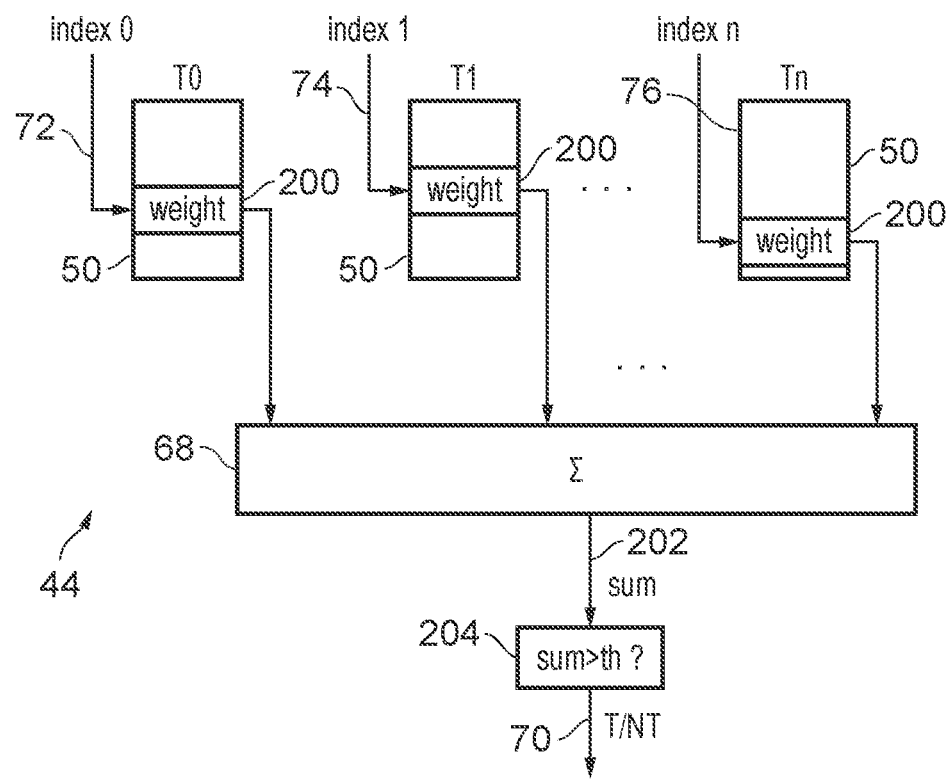
FIG. 10 shows an alternative example where the BDP is a perceptron branch predictor.

A TAGE predictor is just one example of a type of BDP 44, and FIG. 10 shows a different type of BDP 44, called a perceptron predictor. Similar to the TAGE predictor the perceptron predictor includes a number of prediction tables 50 with entries indexed based on different subsets of indexing information 72, 74, 76. For conciseness in FIG. 10 the lookup circuitry 60 is not shown but it may generate the respective sets of indexing information in a similar way to described above for FIGS. 3 and 4, based on hashing different lengths of history information. However, unlike the TAGE predictor, for the perceptron predictor each prediction entry provides a weight value 200, and the weights read from the looked up entries in each of the tables 50 are added together by the prediction generating circuitry 68 to produce a sum value 202 which can then be compared with a threshold by comparison circuitry 204 to provide the predicted branch outcome 70 which indicates whether the branch is predicted taken or not taken. Hence, rather than making a cascaded selection between the alternative predictions provided by each table, the perceptron adds the weights from each of the tables together and then the total of all of the weights indicates whether the prediction is taken or not taken.

The perceptron approach would appear to rely on all of the tables for every prediction and so it may be surprising that it is useful to filter lookups. However, if the weight from one table is much larger than the weight from another table then the table providing the smaller weight value may not contribute significantly to the result, in that regardless of whether that table is looked up, the sum value 202 may still fall the same side of the threshold as if that table's weight was included in the sum performed by the prediction generating circuitry 68. Hence, if a table provides a weight which has a smaller value than the margin between the threshold and the sum of all of the weight values for a given block of instructions, then that table could be excluded from the lookup without changing the overall result.

Figure 11:
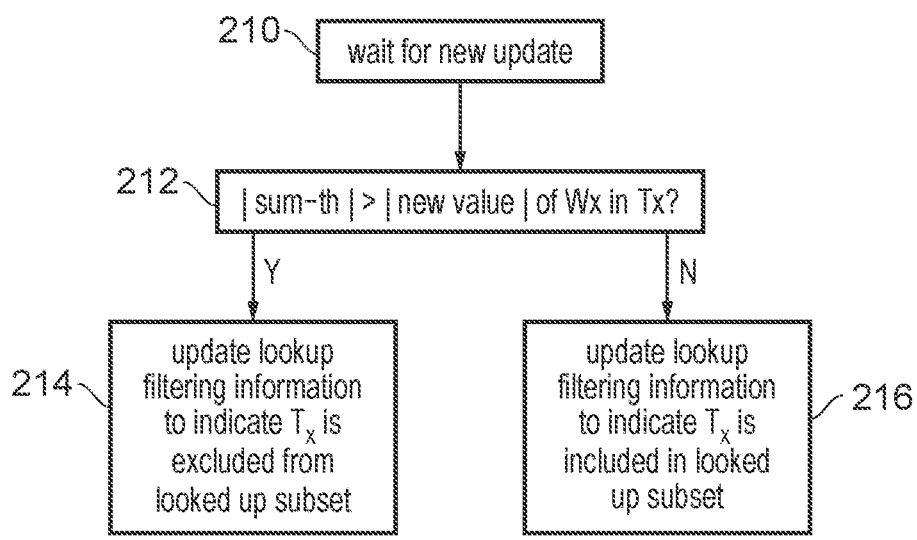
FIG. 11 is a flow diagram showing an example of updating the lookup filtering information for the perceptron branch predictor.

Hence, FIG. 11 shows a way of updating the lookup filtering information 90 for a perceptron based predictor. In this example, instead of representing the lookup information using a threshold class, it may be preferred for the lookup filtering information to include individual or group-based indications of whether each table is within the looked up subset or not, for example based on a bitmap as shown in the example below. Again, at step 210 the table updating circuitry 120 waits for the next update of the state information associated with a given block of instructions, and when such an update is required (having determined the new values of the weights 200 to be written into the respective tables in the entries corresponding to the executed block) at step 212 the table updating circuitry 120 determines based on those updated values whether there is any table Tx for which an absolute magnitude of the corresponding weight value Wx to be written to that table is less than the absolute magnitude of the difference between the overall sum of all of the new weight values to be written into each of the tables for the executed block of instructions and the threshold. If the margin represented by the difference between the sum and the threshold is greater than the magnitude of the new value for weight Wx, then subsequent lookups to table Tx will be redundant, and so at step 214 the lookup filtering information 90 is updated to indicate that table Tx can be excluded from the looked up subset. Alternatively, if table Tx would have contributed to a subsequent prediction, as its value is greater than the margin between the sum of the threshold, then at step 216 the lookup filtering information can be updated to indicate that table Tx is included in the looked up subset. In this way, a threshold predictor can be given information on which table lookups are likely to be effective and then lookups to useless tables can be eliminated to suppress power consumption.

The flow charts in FIGS. 8 and 11 reference a given table Tx as an example of one table, but it will be appreciated that the corresponding steps may be performed for each of the other tables. In embodiments where each table has an independent indication of whether it is in the looked up subset or not, or where the threshold for the class identification is sufficiently fine-grained that it can distinguish each individual table, then there may be no inter-dependency between the updates of lookup filtering information for one table and the updates for other tables. However, if a coarser-grained representation of the lookup filtering information is used then it may be possible to indicate that one table Tx is excluded from the looked up subset only if all the other tables with which Tx shares a piece of lookup filtering information are also to be excluded.

Figure 12:
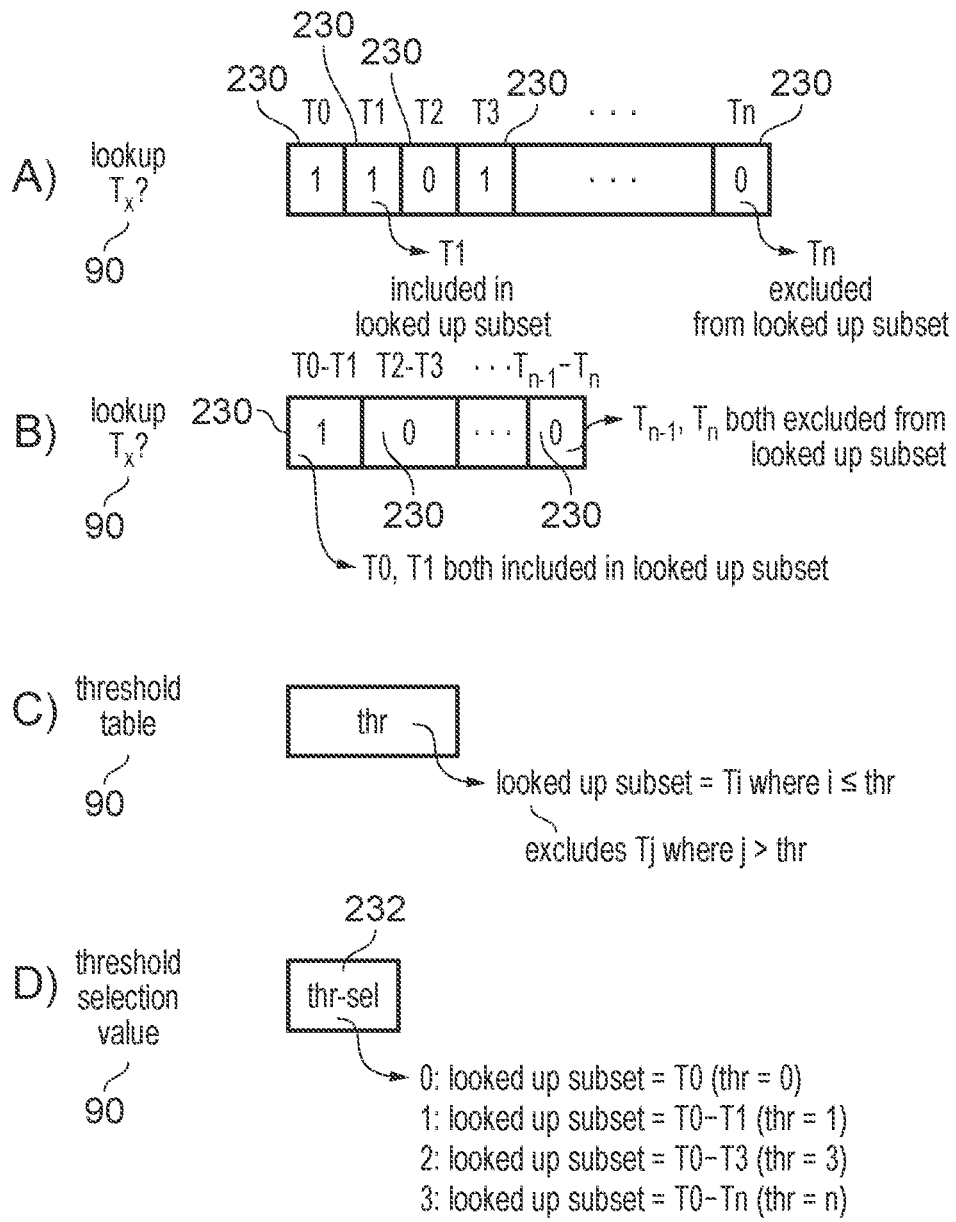
FIG. 12 illustrates a number of examples of representing the lookup filtering information.

For example, FIG. 12 shows different examples of representing the lookup filtering information 90. In example A the lookup filtering information comprises a precise bitmap with individual table subset membership indications (bit flags) 230 for each of the tables 50 of the BDP 44, and so in this case a given table can be excluded from the subset regardless of whether other tables also should be excluded or included.

However, in another example as shown in part B of FIG. 12, the table subset membership indications 230 may be grouped so that each indication 230 corresponds to a group of tables, in this example two adjacent tables. For example, the first flag represents where the tables T0 and T1 can be excluded, the second flag represents where the tables T2 and T3 can be excluded, and so on. Note that while for the perceptron example it may be desirable to be able to include or exclude any of the tables in the subset, for the TAGE example the base predictor 50 need not have any group or individual subset membership bit 230 provided because it may always be looked up in case there are misses in all of the higher tables.

Hence, with the approach in example B, then even if table T2 could be excluded from the looked up subset, T2 may still need to be looked up if table T3 includes a useful entry which cannot be excluded. Hence there may be a trade off between the maintenance and storage overhead of precisely tracking the lookup filtering information 90 for the different tables and the power that can be saved by excluding unnecessary lookups. Some designers may find that the approach in example B may be more efficient overall when considering the storage overhead for the filtering information in each entry of a structure looked up per block of instructions.

While FIG. 12 shows examples where a bit flag of 1 indicates that the corresponding table or group of tables is to be looked up and a bit flag of 0 indicates that the corresponding table or group of tables is to be excluded from the lookup, other approaches could use the opposite encoding. Also it will be appreciated that in the group example of part B, flags could be provided for groups of more than two tables. Also, it is not essential for all of the flags 230 to correspond to the same size group of tables.

As shown in part C of FIG. 12, another approach can be that the lookup filtering information 90 represents a threshold, for example the class threshold described with respect of FIG. 9. In this case the threshold indicates a certain table number identifying a particular table acting as the threshold table, tables with lower table numbers (shorter history) could be included in the looked up subset, and tables with higher table numbers (longer history) could be excluded from the looked up subset (of course other approaches may allocate table numbers the opposite way around, with the lowest table numbers representing tables indexed with longer history). In general, it may be desirable for the excluded tables to be the tables which index their entries based on history information of a longer length than the threshold length table indicated by the threshold table value 90.

The example of part C represents the threshold as a binary numeric value which can uniquely identify any one of the tables as the threshold table, but this is not essential. FIG. 12, part D, shows a different example where the threshold indicating value 232 has fewer bits than the binary value which would be needed to uniquely represent each different table. In this case, some alternative encodings of the threshold indicating value 232 could be selected to represent certain tables as the threshold table, for example with a 2-bit encoding the values of 0, 1, 2, and 3 could be assumed to represent thresholds of T0, T1, T3 and Tn respectively to indicate different sizes of the looked up subset, and this saves bit space in the lookup filtering information by avoiding encodings for representing other possible thresholds. It may be that the overhead of precisely indicating the threshold at every boundary between tables is not justified, and it is enough to have some broad classes of lookup filtering at a few selected points. Hence, with this example if a certain branch requires tables T0, T1, T2 to predict it, then although T3 is not needed, to ensure that the useful tables are looked up then the threshold selection value of 2 would be used and although this means that a redundant lookup of table T3 is still performed, it still saves power by avoiding the lookups to tables T4 to Tn.

Hence, it will be appreciated that there are a wide variety of ways in which the lookup filtering information could be represented for a given block of instructions.

Also, as shown in the examples of FIGS. 13 to 17 there are a number of ways in which the lookup filtering information 90 can be stored within table structures for respective blocks of instructions. FIGS. 13 to 17 illustrate 5 different approaches, but these are just some examples.

Figure 13:
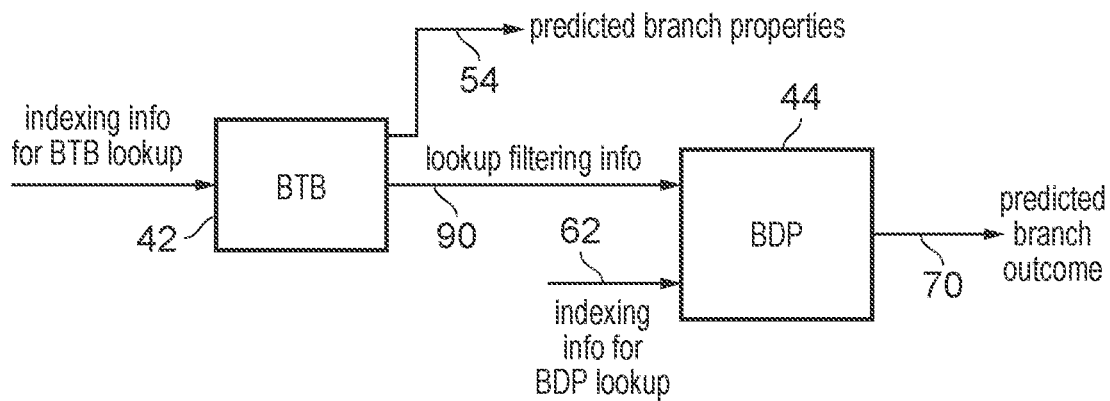
FIGS. 13-17 illustrate a number of examples of different locations at which the lookup filtering information may be stored.

In the example of FIG. 13, the lookup filtering information 90 for a given block of instructions is stored in the corresponding entry of the BTB 42, as in the example shown in FIG. 2. More particularly, the lookup filtering information 90 for a given block of instructions is stored in the same BTB entry 46 which provides the predicted branch properties 54 for that given block. This approach means that the lookup into the BTB 42 is performed sequentially with the lookup into the BDP 44, so that the BDP lookup is initiated once the BTB 42 has already been looked up to provide lookup filtering information 90. Subsequently, the lookup filtering information is used to select which tables in the BDP should be looked up, and then the predicted branch outcome is generated. This approach may be acceptable for some microarchitectures favouring energy efficiency over performance, and can be beneficial because it reuses the existing lookup into the BTB 42 and therefore avoids the power cost of a second structure being looked up.

Alternatively, for processor designers requiring higher performance a dedicated table filtering structure 300 can be provided ahead of the BDP 44 and separate from the BTB 42, so that the BTB lookup 42 can be performed in parallel with the lookups in the table filtering structure 300 and the BDP 44. The table filtering structure 300 can be a smaller structure than the BTB as it may not need to comprise as many entries, and so can be looked up faster than the BTB 42 so that the overall critical path through the table filter 300 and the BDP 44 can be analogous to the lookup through the BTB 42 and performed in parallel as shown in FIG. 14.

Hence, with this approach the program counter associated with a current block of instructions can be looked up in the table filter 300 to identify the lookup filtering information 90, which is then used to decide which tables to look up in the BDP 44 and, in the meantime a parallel lookup is also being performed in the BTB 42. This approach can improve performance compared to FIG. 13.

Figure 15:
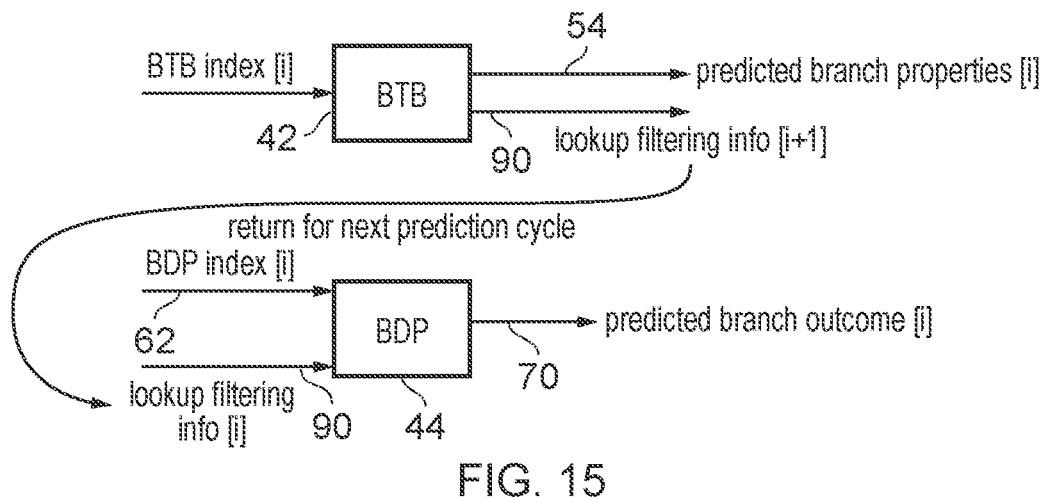

FIG. 15 shows another approach in which the BTB 42 is again used to record the lookup filtering information 90, but in this example the lookup filtering information for the next block of instructions predicted to be executed after the current block is returned by the BTB 42 in response to a lookup into the BTB performed on a current branch prediction cycle for the current block of instructions. Hence, the BTB 42 returns the predicted branch properties 54 for the block of instructions being predicted in cycle i, but returns the lookup filtering information 90 associated with the block of instructions expected to be predicted in cycle i+1. This lookup filtering information can then be returned for use by the BDP 44 in the subsequent prediction cycle, when performing the lookup for the next block.

Hence, in a given prediction cycle for predicting information about the current block in cycle i, the lookup filtering information 90 for that block is provided to the BDP 44, which was actually obtained from the BTB 42 in the preceding cycle i−1. This lookup filtering information 90 is then used by the BDP 44 to select which tables to lookup based on the indexing information 62, and the predicted branch outcome is generated. Hence this approach effectively pipelines the lookup of the filtering information so that it takes place a cycle earlier than the lookup of the corresponding branch prediction state to generate the branch direction prediction, avoiding the delay associated with the sequential lookups in the example shown in FIG. 13 and avoiding the need for an additional table filtering structure 300 as in the example of FIG. 14. Hence, this approach can help to improve performance without the need to introduce extra power consumption by performing an extra lookup.

FIG. 16 shows another example in which the instruction cache 8 is used to store the lookup filtering information 90 and that lookup filtering information gates which tables in the BDP 44 are going to be looked up. For example the instruction cache 8 can be annotated with lookup filtering information derived on updating the BDP 44 in response to actual branch outcomes. Depending on the particular microarchitecture, the instruction cache 8 in some cases may be read early enough that it is possible to use lookup filtering 90 stored in the instruction cache 8 to control which tables are looked up by the BDP 44. Alternatively, in microarchitectures where the instruction cache lookup for a current block of instructions is too late to be able to gate the lookup into the BDP 44 for the current block of instructions, a similar approach to the one in FIG. 15 can be used, where entries in the instruction cache 8 are annotated with lookup filtering information for a subsequent block of instructions so that it will be ready in time for the BDP 44 when it is performing the prediction lookup for that subsequent block of instructions.

FIG. 17 shows another example where some of the prediction tables 50 of the BDP 44 themselves include the lookup filtering information 90 (indicated as F in FIG. 17). For example, the base predictor T0 could be expanded so that each entry provides the filtering information 90 as well as the prediction state value. In this case, the lookups into the prediction tables 50 of the predictor could be sequential so that first the base prediction table T0 is looked up to obtain its prediction and the filtering information 90, and then the lookup filtering information 90 for the current block obtained from the base predictor T0 is used by the lookup circuitry 60 to control whether it is needed to lookup other tables T1 to Tn in the BDP 44.

It will be appreciated that there may also be other techniques that can be used to store the lookup filtering information.

In summary, the techniques discussed above can greatly save power in branch predictors by avoiding lookups which are unnecessary because they do not contribute to the prediction result.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   a branch predictor to provide a predicted branch instruction outcome for a current block of at least one instruction, the branch predictor comprising:
      a plurality of branch prediction tables to store branch prediction entries providing branch prediction information;
      lookup circuitry to perform, based on indexing information associated with the current block, a table lookup in a looked up subset of the branch prediction tables; and
      prediction generating circuitry to generate the predicted branch instruction outcome for the current block based on the branch prediction information in the branch prediction entries looked up in said looked up subset of the branch prediction tables; in which:
   the lookup circuitry is configured to obtain lookup filtering information corresponding to the current block, and to select based on the lookup filtering information which of the plurality of branch prediction tables are in said looked up subset of the branch prediction tables for which the table lookup is to be performed for the current block; and
   the lookup circuitry is configured to suppress performing the table lookup for branch prediction tables other than said looked up subset of the branch prediction tables selected based on the lookup filtering information.

2. The apparatus according to claim 1, in which the plurality of branch prediction tables include at least two branch prediction tables providing the same type of branch prediction information, which are indexed based on different subsets of the indexing information associated with the current block.

3. The apparatus according to claim 1, in which the prediction generating circuitry is capable of generating the predicted branch instruction outcome such that, for at least some instances of generating the predicted branch instruction outcome for the current block, the predicted branch instruction outcome is the same regardless of the branch prediction information stored in a looked up branch prediction entry in at least one of the plurality of branch prediction tables.

4. The apparatus according to claim 1, comprising table updating circuitry to:
   perform a table update, based on an actual branch instruction outcome determined for an executed block of at least one instruction, to update one or more branch prediction entries in an updated subset of the branch prediction tables; and
   depending on the table update, update the lookup filtering information for the executed block.

5. The apparatus according to claim 4, in which the table updating circuitry is configured to set the lookup filtering information for the executed block to indicate that at least one branch prediction table is to be excluded from the looked up subset of the branch prediction tables for the executed block, when the table update is indicative that, following the table update, a subsequent prediction of the predicted branch instruction outcome for the executed block would be the same regardless of the branch prediction information stored in a branch prediction entry corresponding to the executed block in said at least one branch prediction table.

6. The apparatus according to claim 4, in which the table updating circuitry is configured to set the lookup filtering information for the executed block to indicate that at least one branch prediction table is to be included in the looked up subset of the branch prediction tables for the executed block, in response to the table update allocating a new branch prediction entry for the executed block in said at least one branch prediction table or determining that a subsequent prediction of the predicted branch outcome for the executed block would depend on the branch prediction information stored in a branch prediction entry corresponding to the executed block in said at least one branch prediction table.

7. The apparatus according to claim 1, in which the branch predictor comprises a branch direction predictor for which the predicted branch instruction outcome comprises a taken/not-taken outcome;
   the apparatus comprises a branch target buffer (BTB) comprising a plurality of BTB entries to provide a prediction of at least one other branch property for the current block; and
   the lookup circuitry is configured to obtain the lookup filtering information from a selected BTB entry of the BTB.

8. The apparatus according to claim 7, in which the selected BTB entry comprises the BTB entry corresponding to said current block.

9. The apparatus according to claim 7, in which the selected BTB entry comprises a BTB entry corresponding to a preceding block looked up in a preceding branch prediction cycle to a branch prediction cycle in which the predicted branch instruction outcome is generated for the current block.

10. The apparatus according to claim 1, in which the lookup circuitry is configured to obtain the lookup filtering information from a lookup filter storage structure comprising a plurality of lookup filter entries, each lookup filter entry mapping an instruction address of a respective block of at least one instruction to corresponding lookup filtering information.

11. The apparatus according to claim 10, in which the branch predictor comprises a branch direction predictor for which the predicted branch instruction outcome comprises a taken/not-taken outcome;
the apparatus comprises a branch target buffer (BTB) comprising a plurality of BTB entries to provide a prediction of at least one other branch property for the current block; and
a lookup time for looking up said lookup filter storage structure is shorter than a lookup time for looking up said BTB.

12. The apparatus according to claim 1, in which the lookup circuitry is configured to obtain the lookup filtering information from a branch prediction entry looked up in at least one of said plurality of branch prediction tables for the current block, the lookup filtering information specifying whether at least one other branch prediction table is in said looked up subset of branch prediction tables for the current block.

13. The apparatus according to claim 1, in which the lookup circuitry is configured to obtain the lookup filtering information from an instruction cache.

14. The apparatus according to claim 1, in which the lookup filtering information for the current block comprises a plurality of table subset membership indications each indicating whether a corresponding set of one or more branch prediction tables is in said looked up subset of branch prediction tables for the current block.

15. The apparatus according to claim 14, in which, for at least one of said plurality of table subset membership indications, the corresponding set of one or more branch prediction tables comprises two or more branch prediction tables.

16. The apparatus according to claim 1, in which the plurality of branch prediction tables are indexed based on different lengths of history information;
the lookup filtering information for the current block is indicative of a threshold table selected from said plurality of branch prediction tables; and
the looked up subset of branch prediction tables excludes branch prediction tables for which the length of history information used for indexing is longer than the length of history information used for indexing for the threshold table.

17. The apparatus according to claim 16, in which the lookup filtering information specifies the threshold table from among a plurality of candidate threshold tables, said plurality of candidate threshold tables excluding at least one of said plurality of branch prediction tables.

18. The apparatus according to claim 1, in which the plurality of branch prediction tables comprise tagged-geometric (TAGE) tables, indexed based on different lengths of history information associated with the current block; and
when the table lookup hits in at least two TAGE tables, the prediction generating circuitry is configured to generate the predicted branch instruction outcome based on a hit branch prediction entry in one of said at least two TAGE tables indexed based on a longest length of history information.

19. The apparatus according to claim 1, in which the plurality of branch prediction tables comprise perceptron weight tables, indexed based on different subsets of indexing information associated with the current block; and
the prediction generating circuitry is configured to generate the predicted branch instruction outcome by adding weights obtained from the branch prediction entries looked up in said looked up subset of the branch prediction tables.

20. A branch prediction method for providing a predicted branch instruction outcome for a current block of at least one instruction, the branch prediction method comprising:
obtaining lookup filtering information corresponding to the current block;
selecting, based on the lookup filtering information, which of a plurality of branch prediction tables are in a looked up subset of the branch prediction tables for which a table lookup is to be performed for the current block, the plurality of branch prediction tables storing branch prediction entries providing branch prediction information;
based on indexing information associated with the current block, performing the table lookup in the looked up subset of the branch prediction tables; and
generating the predicted branch instruction outcome for the current block based on the branch prediction information in the branch prediction entries looked up in said looked up subset of the branch prediction tables; in which:
the table lookup is suppressed for branch prediction tables other than said looked up subset of the branch prediction tables selected based on the lookup filtering information.

* * * * *